(12) United States Patent
Zolotow et al.

(10) Patent No.: US 12,093,684 B2
(45) Date of Patent: Sep. 17, 2024

(54) APPLICATION TRANSITION AND TRANSFORMATION

(71) Applicant: KYNDRYL, INC., New York, NY (US)

(72) Inventors: Clea Zolotow, Key West, FL (US); Susheel Gooly, Singapore (SG); Rudolph C. Baron, Jr., Marietta, GA (US); Kim Poh Wong, Singapore (SG); Marci D. Formato, Clintondale, NY (US); Tedrick N. Northway, High Springs, FL (US)

(73) Assignee: Kyndryl, Inc., New York, NY (US)

( * ) Notice: Subject to any disclaimer, the term of this patent is extended or adjusted under 35 U.S.C. 154(b) by 142 days.

(21) Appl. No.: 17/821,288

(22) Filed: Aug. 22, 2022

(65) Prior Publication Data

US 2024/0061674 A1 Feb. 22, 2024

(51) Int. Cl.
*G06F 8/70* (2018.01)
*G06F 8/20* (2018.01)
(Continued)

(52) U.S. Cl.
CPC ............ *G06F 8/70* (2013.01); *G06F 8/20* (2013.01); *G06F 11/3612* (2013.01); *G06N 20/00* (2019.01)

(58) Field of Classification Search
CPC .......... G06F 8/70; G06F 8/20; G06F 11/3612; G06F 11/3466; G06F 8/36; G06F 8/40; G06F 8/72; G06F 8/76; G06N 20/00
(Continued)

(56) References Cited

U.S. PATENT DOCUMENTS 7,076,762 B2 7/2006 Fisher
7,240,338 B1 7/2007 Bell et al.
(Continued)

OTHER PUBLICATIONS

Prasandy et al, "Migrating Application from Monolith to Microservices", 2020, [Online], pp. 726-731, [Retrieved from internet on Jun. 14, 2024], <https://ieeexplore.ieee.org/stamp/stamp.jsp?tp=&arnumber=9211252> (Year: 2020).*

(Continued)

*Primary Examiner* — S. Sough
*Assistant Examiner* — Zengpu We
(74) *Attorney, Agent, or Firm* — CANTOR COLBURN LLP; Erik Swanson

(57) ABSTRACT

Application transition and transformation is provided by observing and analyzing execution of a monolithic application to provide properties of the data communication of the monolithic application, identifying, by an artificial intelligence engine, atomic application element(s) having logical functional block(s) that function independent of other atomic application element, determining, by the artificial intelligence engine, candidate atomic application element(s) for migrating out of the monolithic application and refactoring, based on automated testing and validation, refactoring at least one candidate atomic application element into a respective at least one refactored element, where the refactoring selects a platform technology for the refactored element and implements functionality of the candidate atomic application element as the refactored element of the selected platform technology, and providing the at least one refactored element to system(s) for execution thereon.

20 Claims, 6 Drawing Sheets

(51) Int. Cl.
*G06F 11/36* (2006.01)
*G06N 20/00* (2019.01)

(58) Field of Classification Search
USPC .......................................................... 717/120
See application file for complete search history.

(56) References Cited

U.S. PATENT DOCUMENTS

| | | | |
|---|---|---|---|
| 7,467,375 | B2 | 12/2008 | Trondreau et al. |
| 8,930,919 | B2 | 1/2015 | Bhaskara et al. |
| 10,606,573 | B2 | 3/2020 | Apte et al. |
| 10,996,935 | B2 | 5/2021 | Jonnadula et al. |
| 11,726,778 | B2 * | 8/2023 | Sridhara ............... G06F 9/547 717/110 |
| 11,847,443 | B2 * | 12/2023 | Tamilselvam ............ G06F 8/72 |
| 2007/0067756 | A1 | 3/2007 | Garza |
| 2021/0165640 | A1 | 6/2021 | Gilpin et al. |
| 2021/0263735 | A1 * | 8/2021 | Harishankar ............ G06F 8/31 |
| 2023/0142895 | A1 * | 5/2023 | Campbell ............... G06F 8/76 717/140 |
| 2023/0195435 | A1 * | 6/2023 | Jaeger ................. G06F 8/4441 717/143 |

OTHER PUBLICATIONS

"Docker Launches New Program for Migrating Legacy Windows Server 2008 Applications to Alleviate End of Support Issues", Docker, Nov. 8, 2018, 3 pgs. Retrieved on Dec. 3, 2021 from the Internet URL: https://www.docker.com/docker-news-and-press/docker-launches-new-program-migrating-legacy-windows-server-2008-applications.

"COBOL Modernization", TSG Software, 12 pgs. Retrieved on Dec. 3, 2021 from the Internet URL: http://www.tsg.co.uk/downloads/Cobol%20to%20Java.pdf.

Abeysinghe, A., et al., "Cell-Based Architecture—A Decentralized Reference Architecture for Cloud-native Applications", 2021, 18 pgs. Retrieved on Dec. 3, 2021 from the Internet URL: https://github.com/wso2/reference-architecture/blob/master/reference-architecture-cell-based.md.

Mell, Peter, et al., "The NIST Definition of Cloud Computing", NIST Special Publication 800-145, Sep. 2011, Gaithersburg, MD, 7 pgs.

Vaswani, A., "Attention Is All You Need", 31st Conference on Neural Information Processing Systems (NIPS 2017), 11 pgs. Retrieved on Dec. 3, 2021 from the Internet URL: https://papers.nips.cc/paper/7181-attention-is-all-you-need.pdf.

"Leveraging Artificial Intelligence to Identify Source Code Vulnerabilities", 1st Global Cyber Security Observatory 2021, 6 pgs. Retrieved on Dec. 3, 2021 from the Internet URL: https://cyberstartupobservatory.com/leveraging-artificial-intelligence-to-identify-source-code-vulnerabilities/.

Screen captures from YouTube video clip entitled "Machine Learning for source code analysis—Alexander Bezzubov—FOSSASIA Summit 2017", 14 pgs., uploaded on Mar. 18, 2017 at https://www.youtube.com/watch?v=M_hOn-Ren1M).

Bezzubov, A., "Tools for large-scale collection & analysis of source code repositories", 25 pgs. Retrieved on Dec. 3, 2021 from the Internet URL:https://archive.fosdem.org/2018/schedule/event/large_scale_repo_analysis/attachments/slides/2400/export/events/attachments/large_scale_repo_analysis/slides/2400/FOSDEM_18__Tools_for_large_scale_collection_and_analysis_of_source_code_repositories.pdf.

"IBM Cloud Private", retrieved on May 31, 2022 from the Internet URL: < https://www.IBM.com/docs/en/cloud-private/3.1.2?topic=started-cloud-private-overview > (last updated May 13, 2022), 6 pgs.

* cited by examiner

APPLICATION TRANSITION AND TRANSFORMATION

BACKGROUND

Software applications can become outdated due to advancements in operating systems, hardware/software platforms, and other technologies. In many cases it may be desired due to dependence on critical applications and other factors to migrate these so-called 'legacy applications' for modern use through transformation and transition processes.

SUMMARY

Shortcomings of the prior art are overcome and additional advantages are provided through the provision of a computer-implemented method. The method observes and analyzes execution of a monolithic application to be migrated. The execution includes data communication of the monolithic application, and the analyzing provides properties of the data communication of the monolithic application. The method further identifies, by an artificial intelligence engine, and based at least in part on the provided properties of the data communication, atomic application elements of the monolithic application. Each atomic application element of the atomic application elements includes a respective logical functional block, of the monolithic application, that functions independent of other atomic application elements of the monolithic application. The method determines, by the artificial intelligence engine, one or more candidate atomic application elements, of the atomic application elements, as candidates for migrating out of the monolithic application and refactoring. Further, based on automated testing and validation of at least some of the candidate atomic application elements, the method refactors at least one candidate atomic application element of the one or more candidate atomic application elements into a respective at least one refactored element. Refactoring each candidate atomic application element of the at least one candidate atomic application element into its respective refactored element selects a platform technology for the refactored element and implements functionality of the candidate atomic application element, including the logical functional block thereof, as the refactored element of the selected platform technology. The method additionally provides the at least one refactored element to one or more systems for execution thereon.

Further, a computer system is provided that includes a memory and a processor in communication with the memory, wherein the computer system is configured to perform a method. The method observes and analyzes execution of a monolithic application to be migrated. The execution includes data communication of the monolithic application, and the analyzing provides properties of the data communication of the monolithic application. The method further identifies, by an artificial intelligence engine, and based at least in part on the provided properties of the data communication, atomic application elements of the monolithic application. Each atomic application element of the atomic application elements includes a respective logical functional block, of the monolithic application, that functions independent of other atomic application elements of the monolithic application. The method determines, by the artificial intelligence engine, one or more candidate atomic application elements, of the atomic application elements, as candidates for migrating out of the monolithic application and refactoring. Further, based on automated testing and validation of at least some of the candidate atomic application elements, the method refactors at least one candidate atomic application element of the one or more candidate atomic application elements into a respective at least one refactored element. Refactoring each candidate atomic application element of the at least one candidate atomic application element into its respective refactored element selects a platform technology for the refactored element and implements functionality of the candidate atomic application element, including the logical functional block thereof, as the refactored element of the selected platform technology. The method additionally provides the at least one refactored element to one or more systems for execution thereon.

Yet further, a computer program product including a computer readable storage medium readable by a processing circuit and storing instructions for execution by the processing circuit is provided for performing a method. The method observes and analyzes execution of a monolithic application to be migrated. The execution includes data communication of the monolithic application, and the analyzing provides properties of the data communication of the monolithic application. The method further identifies, by an artificial intelligence engine, and based at least in part on the provided properties of the data communication, atomic application elements of the monolithic application. Each atomic application element of the atomic application elements includes a respective logical functional block, of the monolithic application, that functions independent of other atomic application elements of the monolithic application. The method determines, by the artificial intelligence engine, one or more candidate atomic application elements, of the atomic application elements, as candidates for migrating out of the monolithic application and refactoring. Further, based on automated testing and validation of at least some of the candidate atomic application elements, the method refactors at least one candidate atomic application element of the one or more candidate atomic application elements into a respective at least one refactored element. Refactoring each candidate atomic application element of the at least one candidate atomic application element into its respective refactored element selects a platform technology for the refactored element and implements functionality of the candidate atomic application element, including the logical functional block thereof, as the refactored element of the selected platform technology. The method additionally provides the at least one refactored element to one or more systems for execution thereon.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
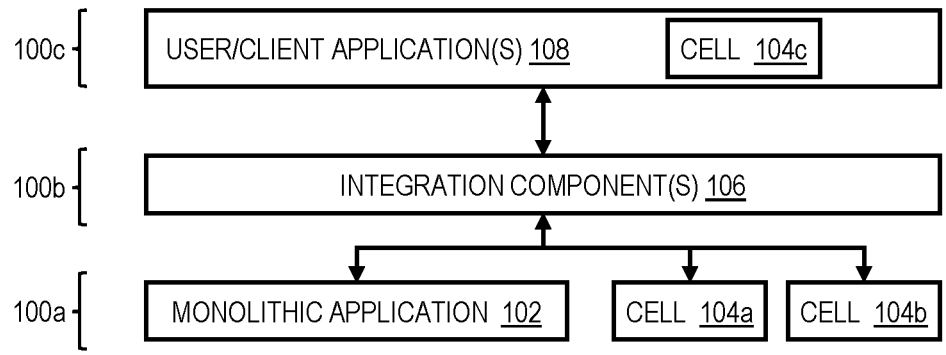
FIG. 1 depicts a conceptual diagram of an ongoing transition and transformation of a monolithic application in accordance with aspects described herein.

Migration of a legacy application can be a difficult task. Often times the legacy application is a relatively large, monolithic application and moving the application between locations, operating systems, platforms, etc. is a challenge. The application usually pre-dates any current support staff and has been modified beyond the original/existing design. Developers who wrote the application are often no longer available, and documentation may be sparse and incomplete, requiring activities to reverse-engineer the application in order to understand how it works.

Described herein are approaches for transition and transformation of monolithic applications to migrate the applications, or at least some functionalities thereof. Aspects can migrate monolithic applications in component pieces/portions while ensuring that migration across different hardware environments is possible without necessitating application reinstall. Transition and transformation time may be shortened.

Often, a monolithic application to be migrated is considered a 'legacy' application, though this need not always be the case. Thus, some aspects discussed herein may be presented with reference to a 'legacy' application for migration, but it should be understood that these aspects apply more generally to monolithic applications having component application elements discussed herein.

Some tools or approaches for application transition and transformation focus on technology-specific deployments (such as those of a specific web application server platform) or migrate only code of a specific programming language. Some more difficult portions of legacy applications can be converted into virtual machines or containerized applications. For instance, a COBOL-based portion, routine, or application that is part of a main environment (larger monolithic application) might be encapsulated in a container or a virtual machine as a stand-alone unit that can post execution back to the main environment. Meanwhile, middleware of the application may be transformable into a containerized environment, while other portions of the application, such as large sorts and search facilities, might best be kept on legacy equipment and optionally encapsulated on a legacy system for tuning, due to performance needs.

Aspects described herein take an atomic, cell-based approach to transition and transformation of a larger monolithic application. An 'atomic application element' refers to a cell, procedure, function call, routine, portion, section, or building block of code, of the larger legacy application, that stands alone in that it has a logical functional block functioning independent of other atomic application elements of the application, i.e. with no internal code dependencies (that is, code dependencies upon other atomic application elements of the legacy application—code of one atomic element is not reliant on code of the others). Code (in)dependency is a separate concept from data dependency that might see data moving between the atomic elements. there may be data-related dependencies as data may be passed between atomic elements). An atomic application element may also be referred to as a 'cell' herein. A cell could be, for instance, a compilable unit, such as a subroutine for example. A cell-based migration as described herein enables quick transition and transformation of individual portions of the application, in which such portions are individually refactored and provided as refactored element(s) sitting outside of the monolithic application.

In additional aspects described herein, the cellular structure of the application migration follows a 'strangler architecture pattern'. A strangler architecture pattern in this context refers to the decoupling, removal, and refactoring of individual cells with logical functional blocks from the monolithic application such that the monolith becomes progressively smaller. The functionality provided by individual cells removed from the monolith and refactored is migrated to refactored element(s) outside of the monolith, and the monolith shrinks over time as more cells are migrated. A cellular structure may therefore be used in a strangler pattern approach to migration implementation.

Referring to FIG. 1, presented is a conceptual diagram of an ongoing transition and transformation of a monolithic application 102. The monolithic application 102 executes on a backend/mainframe system (not pictured) in a backend layer 100*a* of an environment 100. A user application layer 100*c* includes user/client application(s) 108 with which users interact to engage with application functionality. Between the backend layer 100*a* and user application layer 100*c* is integration layer 100*b* having integration component(s) 106 (e.g., hardware and/or software) providing integration functions to integrate user application layer 100*c* with the backend layer 100*a* to the extent necessary, for instance to integrate with elements executing in the backend layer 100*a*, such as those remaining within the monolithic application 102 and cells 104*a* and 104*b*.

Cells 104*a*, 104*b* and 104*c* are portions of the monolithic application 102 that have been transitioned (migrated) out of the monolithic application 102. These atomic application elements of the monolithic application have been refactored into refactored elements 104*a*, 104*b*, 104*c*. In this example, cells 104*a* and 104*b* execute on backend system(s) of layer 100*a*, which may be the same or different system(s) than those on which the monolithic application 102 executes. Cell 104*c* has been transitioned away from the backend layer 100*a* for execution in the user application layer 100*c*. User/client application(s) 108 need not necessarily execute locally for a user, i.e., on a user device, and could instead execute in whole or in part on cloud system(s) or other servers/'backends', as examples. A distinction between cells 104*a* and 104*b* in layer 100*a* and cell 104*c* in layer 100*c* may be that functions of cells 104*a* and 104*b* are accessed via the integration component(s) 106. The proximity of cells 104*a* and 106 to the monolithic application 102 may in some instances be necessitated because of one or more requirements for proper integration between them.

Initially, the monolithic application 102 included various functionality, including the functionality of transitioned cells 104*a*, 104*b* and 104*c*. The migration at the point depicted in FIG. 1 has migrated cell 104*a* out of the backend and into the user/client application layer 100*c*. It may be a goal to migrate cells 104*a* and 104*b*, as well as additional cell(s) of the monolithic application 102, out of the backend and into the user/client application layer 100*c*, and therefore eliminate any reliance on backend layer 100a functionality and integration component(s) 106. In some embodiments, all relevant functionality of the monolithic application 102 may be extracted as cell(s) such that the monolithic application 102 is dissolved and can be eliminated. In other embodiments, one or more aspects of the monolithic application 102 are to remain in the monolith indefinitely, perhaps with counterpart cell(s) remaining in the backend due to technical or other limitations/requirements. In this regard, it may be desired in some instances to keep some functionality in the monolith. Accordingly, application functionality that has not been migrated out of the application can remain provided by the monolithic application while refactored element(s) that execute outside of the application provide their respective functionality (formerly provided in the monolith) outside of the monolith. Such functionalities can be provided contemporaneously and cooperatively to user(s) of the application and, over time, additional elements may be refactored to migrate further functionality to outside of the monolithic application.

The refactoring of the cells produces building blocks for the migration and can take any desired form. As a specific example in which a monolithic application is to be decomposed and migrated, cells of a particular code type such as COBOL or JAVA® (which is a registered trademark of Oracle Corporation, Austin, Texas) can be removed from the application with refer-backs to container(s) running in another architecture. A web application component could meanwhile be removed and refactored separately, while sort sequences, as examples, may be left alone in the legacy environment. These refactorings can be made independent of each other and at different times. In another example, the monolithic application is a mainframe-executed COBOL application that can be deconstructed into cell(s) of business logic and cell(s) of technical work. As examples, the business logic includes data copy operations to perform on data meeting defined criteria, while the technical logic includes sorting to be performed on the data. The business logic can be separated and migrated into a cloud environment (as one example) and the technical logic can remain, at least temporarily, on the mainframe. Other separations may be based on tiers of the monolithic application. For instance, an application constructed with a data tier, a middleware tier, and a frontend tier all implemented on the backend mainframe/legacy system might be separated along tier lines with some cells being migrated out of the backend to other platform(s).

The transition and transformation process for an application could vary in its duration, ranging from something relatively short (e.g., a few hours) to something relatively long (e.g., several years). In this regard, the migration might be an ongoing endeavor and progress if, and when, appropriate technologies are identified or developed, or user needs/requirements change, to support a proper refactoring of appropriate atomic application elements. An overall goal in taking a cellular, strangler pattern approach, however, may be to speed-up an otherwise difficult and prolonged application transition and transformation process. Decomposing the monolith by atomic application elements enables the necessary logic to be retained within the module/legacy environment and thus avoid a complete re-write of that logic, which ordinarily would have been undertaken in conventional approaches to application transformation.

In some aspects, artificial intelligence (AI) is used in decomposing and refactoring the legacy application. In contrast to an all-or-nothing approach for migration that can be time consuming and unproductive, a strangler pattern for migration together with machine learning-based decision-making about which candidate cells to migrate can avoid attempted and unsuccessful refactoring of portions that are best left unmigrated (such as technical logic referenced above). Specifically, AI provides an analytical perspective that examines the capability/functionality of each logical functional block within the application and identifies whether it can be extracted as an autonomous piece of work to be decomposed and run by itself as a building block for assembly of application functionality outside of the monolith and using the best technologies possible for each individual cell. The AI can identify logic/functionality to extract as cells and logic/functionality to retain in the monolithic application. It might identify, based for instance on historic and learned scenarios, that refactoring a particular database piece into something virtualized or containerized outside of the monolith is undesirable, whereas refactoring interface logic to a web frontend is best. The AI in this respect can inform the decoupling of application functionality from the legacy environment where possible. In some examples, it relies on heuristic-based algorithms to identify data usage, identify and remove extraneous or non-functional code ("dead code") if recognized, and optimize cells into a transportable format (for instance a virtual machine or container), as examples.

Aspects of this process can refer to a refactoring blueprint to inform the refactoring. From a conceptual standpoint, the blueprint holds the 'boundaries' of what is possible for atomic element migration, providing guidance, options, and other information to inform selection of a platform technology (also referred to as a reference architecture) based on noted requirements for the atomic application element. The platform technology includes a platform to run the refactored element. Properties of platform technologies can encompass hardware and software elements—bare metal, mainframe, database, image, enterprise integration platform, and service platforms such as Software-as-a-Service, Database-as-a-Service, Container-as-a-Service, and/or Infrastructure-as-a-Service platforms, virtual machines, microservices, etc. In specific examples, the selected platform technology includes a portable and scalable format such as a container, a virtual machine, and/or a microservice.

Different types of platform technologies may be available and usable, though not all may be optimal or even acceptable solutions for the atomic application elements. A knowledge-base can hold useful information in the form of these refactoring blueprints to inform what works, what does not work, customer-specific preferences, and information about past migrations, all of which can be useful in future decision making. One blueprint might inform refactoring cells of varying type(s) to a particular first operating system, while another blueprint might inform refactoring of the same types of cell(s) to a particular second operating system different from the first operating system.

As a further enhancement, automated build verification testing (also referred to as sanity testing, smoke testing, confidence testing, and build acceptance testing) may be performed against atomic application elements to automatically identify whether performance issues are present with respective non-functional requirement(s), and raise any issues to address if such issues are present. This provides validation through testing to determine whether the application element is eligible for refactoring. Such testing can optionally be performed in a stand-alone environment to ensure proper functionality before changes are made to the monolithic application in production. Additionally, automated validation and testing can automatically identify and removing extraneous, non-functional code from the candidate atomic application element when recognized, and the refactoring of that element can refactor the element based on removing the extraneous, non-functional code therefrom.

There may be situations, for instance when moving to a stateless/no-sharing application, in which code duplication occurs to run multiple instances of a function in two different platforms, for instance when converting from a stateless/no-sharing application some may run on the mainframe with duplicate code running transactions in a midrange environment. This may be used for parallel transaction processing for example.

Additionally or alternatively, stateful environments (e.g., object storage) may need to be kept for some functions and/or a stateful portion of the legacy application could be retained in the monolith and potentially refactored later. The existence of the object storage and the access to the back end of that storage could be retained in the mainframe, for instance, with the data simply moving to the new atomic application.

As yet another enhancement, aspects can refresh product documentation utilizing, for example, Universal Markup Language (UML) output as an artifact of the intelligence analysis. The refresh can be directed to the refactored functionality and its dependencies, including remaining legacy functionality. The refreshed documentation can help eliminate future risks associated with system administrative actions being taken without a full comprehension of the installed design.

An example migration process to migrate a legacy application atomicizes the application into atomic application elements, also referred to herein as cells. Initially, the application is scanned to observe and analyze execution of the application to be migrated. The execution of the application includes data communication of that application, and the analysis provides properties of this data communication. By way of specific example, the scan is performed as part of an affinity study that gathers data about the nature of data communication and processing of the application, for instance communication between the application and other application(s) with which it communicates. More specifically, data communication observed can be internal communication (between atomic application elements of the monolithic application) and/or external communication (between atomic application element(s) of the monolithic application and external component(s) that is/are external to the monolithic application).

In specific embodiments, script(s) can execute to scan the legacy application. The script(s) may be executed on any appropriate hardware/nodes to accomplish this, such as backend system(s) on which the legacy application executes and possibly other systems. Other discovery methods may additionally or alternatively be used for the affinity study.

A purpose of the affinity study can be to inform of the dependencies (e.g. code dependencies, data dependencies, and others if applicable) that particular cellular functionality of the application has on external entities, for instance calls that logic of a cell makes to a particular external data provider. The migration can ensure that the refactoring of the cellular functionality accounts for such dependencies, for instance by implementing in the refactored element functionality the calls to the external data provider (as was performed by the legacy application) or providing the external data in another way, as examples.

The data resulting from the affinity study data, together with applications integration knowledge, can be ingested by a machine learning-based AI engine. The AI engine can identify, based at least in part on the provided properties of application data communication of the application, atomic application elements of the application, with each such atomic application element including a respective logical functional block, of the monolithic application, that functions (from a code dependency standpoint) independent of other atomic application elements of the monolithic application. That is, while data can move between atomic elements, code of one is not reliant on code of other(s). The AI engine can additionally or alternatively determine candidates, of the identified atomic application elements, that are candidates for migrating out of the monolithic application and refactoring, and optionally also identify platform technology/technologies for the candidate atomic application element(s).

In this regard, the process of identifying and refactoring cells can leverage machine-learning based AI capabilities that assist by identifying the building blocks for the decomposition of the legacy application in the atomic cellular elements. A machine learning model/engine can be trained using data of/about past-performed migrations/refactorings. Labels attached to the training data can inform about the effectiveness of refactoring decisions in producing desirable outcomes. Example labels might inform technologies to use and/or not use in refactoring cells of varying characteristics, with varying requirements, and in varying situations, as well as which types of elements are currently well-suited and/or not currently well-suited for refactoring. During other performed migrations, the activities performed may be captured and logged, and this can be associated with analyzed outcomes of those activities. The AI can learn which technologies work well and which do not in different situations. It might, for instance, identify that refactoring components of a particular type or characteristic into a particular microservice architecture is best to use, or perhaps that instead it is best to retain such components in the legacy application. Over time as additional migrations, perhaps across new environments, are performed and more data is gathered to inform about what works best and what does not, the AI learns of the most effective approaches to cellular-based migration of monolithic applications. The machine learning can draw from a collection of migrations that have been performed, which may be particularly effective when migration activities are to be provided as a service, for instance in a Migration-as-a-Service (MaaS) offering. The cells, as atomic elements, can then be mapped into refactoring blueprints to re-create the application logic using, e.g., workflow and automation.

Thus, aspects described herein present methods of application transition and transformation, in which a monolithic application is scanned, for instance using scripts that are executed on the nodes, to gather data on the nature of the communications of the application (incoming, outgoing, and internal between modules of the application, as examples). This data is then injected into an AI engine with machine learning capabilities. Validation/testing (e.g., build verification testing) can be performed and, when complete, decomposed building blocks (cells) can then be mapped to refactoring blueprints to re-create the application logic as refactored elements using workflow and automation.

Figure 2:
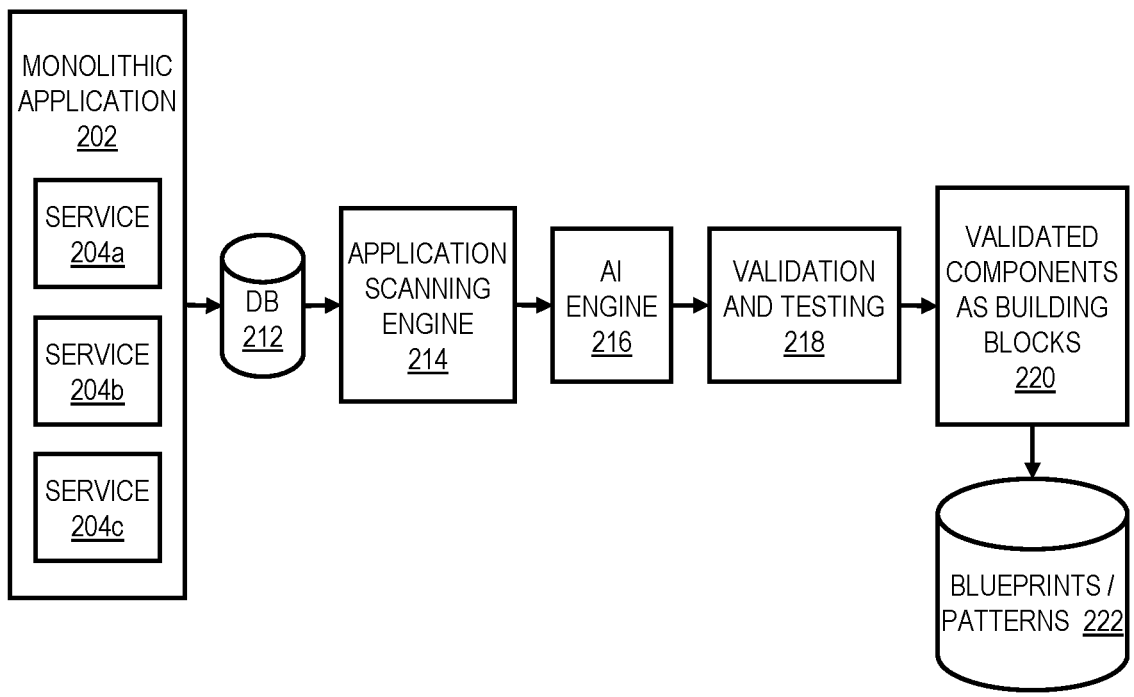
FIG. 2 depicts an example flow for application transition and transformation in accordance with aspects described herein.

An example flow to achieve the foregoing is presented with reference to FIG. 2. Monolithic application 202 includes services 204a, 204b and 204c as atomic application elements. Services could be any logical functional blocks that function independent, from a code dependency standpoint, of the other atomic application elements, for instance creation/instantiation of a construct (such as a calendar reminder), performance of a calculation based on inputs, or a data copy/store operations, as examples. Application 202 is a monolithic legacy application in these examples, and hence these services 204a, 204b, 204c are part of a one build.

Data descriptive of application 202 are logged in database 212. That data is used by an application scanning engine 214 in an affinity study that examines the application data flows associated with the application, for instance calls and communications made by the application and communications received by the application. These activities can reflect fundamental characteristics of the application. In some embodiments, the scanning is performed with a focus on a selected or specified software-as-a-service application development methodology to be used to achieve goals such as portability and resilience in deployment(s) of the migrated application. An example such methodology is the Twelve-Factor App Methodology that examines (i) Codebase, (ii) Dependencies, (iii) Config, (iv) Backing services, (v) Build, release, run pipeline, (vi) Processes, (vii) Port binding, (viii) Concurrency, (ix) Disposability, (x) Dev/prod parity, (xi) Logs, and (xii) Admin processes. The methodology and/or individual methodology components to inform the study can vary and may change, for instance if newer methodologies are developed.

The results and output of the application scanning engine 214 are consumed by artificial intelligence engine 216. Artificial intelligence is applied by the artificial intelligence engine 216 to the output of the application scanning engine 214, including indications about the usage and execution of the application, which pieces perform which particular functions, and other indications. The artificial intelligence engine 216 can incorporate a machine learning engine that interprets and understands what the different functional components of the monolithic application 202 perform, and the artificial intelligence engine 216 can identify the cells/functional blocks as candidates for transformation.

The identified cells are candidates that can then undergo validation and testing. A validation and testing component 218 is used to determine whether each identified cell is legitimately a cell to be refactored in line with an available and suitable platform technology, including for instance a container, a virtual machine (VM), microservice, or another construct. Blueprints and related patterns explained herein can be used to identify the enterprise architecture(s) that will provide the technology. The validation and testing component 218 is aware, based on the affinity study for example, of the logical functionality and capability that each cell should have in terms what it takes as input, what it performs in response, what its output looks like, and how it fits with other functionality both inside and outside of the legacy application. The validation and testing component 218 can validate/test whether a refactored element is, or is expected to be, consistent with the foregoing in terms of its functionality and capability. The validation and testing component 218 can perform automated build verification testing of the cells individually and/or collectively as part of a functioning end-to-end application.

As noted, blueprint can store information identifying, or at least indicating/informing of, particular technologies usable in the transformation of the cells. There may be situations in which the artificial intelligence cannot confidently predict a technology to use for effectively transforming a given functionality. The blueprint can inform a default, for instance to retain the functionality in the monolith. As the blueprint/map informs the architecture of the application, this will indicate how transformed functionality communicates with other functionality, either retained within the monolith or separately transformed as part of other cell(s).

After each component is validated as a building block (220) for the transition/transformation, the identified codebase and capability may be 'locked' in that it is stored in a blueprints/patterns database 222 and indicated within the corresponding blueprint/map, also stored in the database 222. Locking the component can ensure no changes are made when the application is reassembled, i.e., the transformed cells and any legacy functionality remaining within the monolith are placed into production. The database 222 retains the blueprint/map for the application, which reflects how to recompose the application using these transformed pieces. In some embodiments, this follows a selected or specified Software-as-a-Service application development methodology, such as the Twelve-Factor App Methodology.

Refactoring a candidate atomic application element into its respective refactored element of a selected platform technology may therefore be performed based on the automated validation and testing indicating proper functionality of the refactored element of the selected platform technology. In particular examples, the selected platform technology includes a portable and scalable format, for instance a container, a virtual machine, and/or a microservice.

Figure 3:
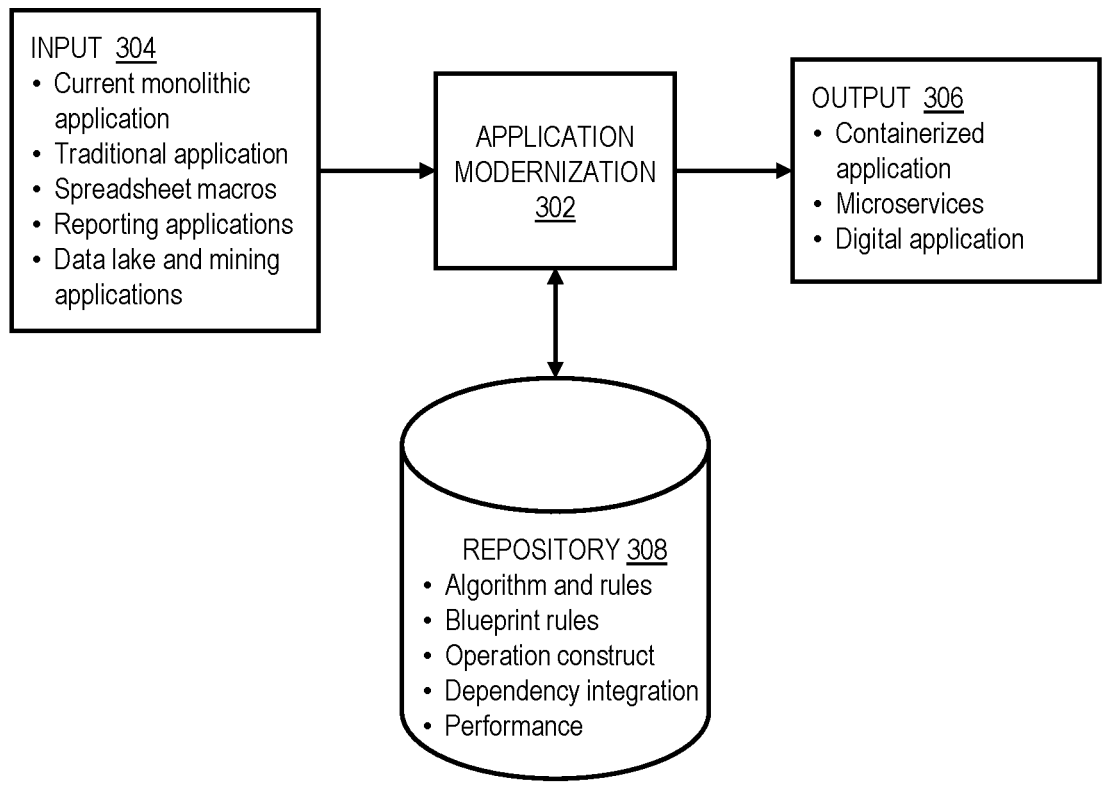
FIG. 3 depicts an example component model for application transition and transformation, in accordance with aspects described herein.

Additional aspects are now described with reference to a component model for application transition and transformation shown in FIG. 3. An application modernization AI module 302, as software executing on one or more computer systems, takes input 304 from various sources and produces output 306 as the (at least partially) transformed and transitioned application. Input 304 is obtained from one or more sources, examples of which are the monolithic application to be analyzed and transformed, traditional applications, spreadsheet macros, reporting applications, and/or data lakes/mining applications. Some or all may be provided by the system that hosts the monolithic application. The types of input used by the intelligence of the application modernization module 302 to decompose a given monolithic application under consideration and appropriately cellularize its functionality might vary depending on the situation, including the environments and technologies involved.

The application modernization AI module 302 ingests the input 304 along with requirements and other applicable information from repository 308 to select and produce, based on artificial intelligence processing as described herein, appropriate output 306 as modernized application(s), for instance container, digital, microservice, virtual machine, and other forms of modern applications. The functionality of the application modernization AI module 302 can include elements of FIG. 2, for instance at least elements 214, 216 and 218. The application modernization AI module 302 could, for example, utilize a selected application development methodology (e.g., the Twelve-Factor App Methodology) to inform its decision-making. Additionally or alternatively, it can incorporate a dynamic dependency engine to ensure any relevant dependencies (e.g. data dependencies) can be mapped correctly for continued functionality after refactoring. Relative to a subject atomic application element to be refactored and that is code-independent of the other entities, that subject application element (i) might be dependent (e.g. data dependent) on one or more entities (i.e., other application element(s) which themselves might or might not be set for refactoring and/or external entities external to the monolithic application) and/or (ii) might be a dependency of one or more entities (other application element(s) which themselves might or might not be set for refactoring and/or external entities external to the monolithic application). After refactoring that subject application element into a refactored element, entities dependent on that subject application element may be configured/reconfigured as necessary to depend on the refactored element, and similarly the refactored element may be configured as necessary to depend on that which the subject application element depended when part of the monolithic application prior to refactoring. To the extent that such dependencies of the refactored element have themselves been refactored into other refactored element(s), the refactored element can be configured to depend on these other refactored element(s).

The application modernization AI module 302 can optionally include both cryptographic and non-cryptographic function (hardware-based or otherwise) management, as some applications may be sufficiently critical that they rely on and require such cryptographic functions.

The artificial intelligence of module 302 can continually learn from the observed and/or labeled outcomes of the outputs it produces from given input vectors. This learning can inform the refactoring of application functionality. For instance, the module 302 can learn the best technology to use in different situations to refactor different functionalities. It can also learn how to best implement the strangler architecture pattern, for example prioritization, ordering, and/or timing of functionality/element refactoring and removal from the legacy application. The training to teach the module 302 may be specific to a given legacy application. For instance, for a sufficiently large application that might take months to refactor completely, an AI model can be trained from experience with respect to some functions of that application, before applying the model to other functions of that application. Additionally or alternatively, more generalized training of the AI model can be performed that incorporates data from the transition/transformation of other legacy applications, as 'big data' can sometimes provide training that is generally universally applicable.

Continual learning can be particularly helpful in situations where a best solution in terms of refactoring a given cell is not known initially but becomes known over time as additional technologies are developed and/or more is learned through performance of additional transitions/transformations with measurable outcomes. Updated training of the AI might inform further refactoring. It might be determined after refactoring some element(s) to migrate functionality of other candidate atomic application element(s) out of the monolithic application and to respective other refactored element(s) outside of the application. Additionally or alternatively, execution of some refactored element(s) might inform when/how to refactor other elements. Thus, based on execution of refactored element(s) on computer system(s), a process could gather and analyze data about (i) the system(s) and/or (ii) an environment in which the monolithic application executes, and determine, based on the gathering and analyzing, to migrate functionality of other candidate atomic application element(s).

It is noted that migrating functionality of some atomic application elements out of the monolithic application is likely to change the internal and/or external communications that were observed in the affinity study discussed above. Accordingly, based on migrating functionality of atomic application element(s) out of the monolithic application, it may be desired to perform another affinity study to analyze the communications again, this time of the elements that remain in the monolith and the elements that have been removed and refactored, and this is expected to characterize the changed communications and identify updated dependencies, for instance. This can be useful to inform migration of additional elements out of the monolithic application.

Repository 308 includes other information input to the application modernization AI module 302 and used in its decision-making. Stored algorithms and rules can include particular business rules (such as what interest to charge on particular types of loans) and/or implementing algorithms (such as the algorithm to calculate interest for loan type A versus the algorithm to calculate interest for loan type B) that may be specific to the customer, domain, application, business, or the like. Operation constructs can be dependency and affinity groups that inform relations between components and therefore whether/which components can be moved together out of the legacy application. It might be desirable to package together components when possible. Related to this is dependency integration information that correlates components based on dependencies between them (whether or not they are moved together as part of an operation construct consideration) also inform of impacts that components have on other components. Performance information can include data about monitored application performance and can reveal whether and how partial or total migration affects application performance. Transaction processing performance, as one example, can be monitored before, during, and after migration for comparison. This can be one marker of migration effectiveness and inform some of the learning of the application modernization module 302.

The repository 308 could optionally be specific to a single monolithic application being transformed, though in other embodiments repository information across various transformations can provide knowledge useful across other migrations. For instance, decisions made for a successful migration of a first legacy application for which given business rules and uses apply might be informative of decisions to make in migrating a second legacy application for which the same or similar business rules/uses apply.

AI, such as a machine learning model, which could be part of or separate from other AI functionality discussed above, can be trained using a self-attention mechanism having a performance vector configured to train the AI to identify atomic application elements that can confidently be migrated to one or more platforms, and platform technology for the identified atomic application elements. The machine learning component can utilize, in a specific example, a recurrent neural network (RNN) based on a self-attention mechanism. Attention mechanisms include trained query (Q), key (K), and value (V) layers, in which the mechanism maps a query and a set of key-value pairs (the keys being of dimension $d_k$ and values being of dimension $d_v$) to an output (O). The query, key, value, and output are all vectors. A key-value pair includes two related data elements—a key, which is a constant that defines the data set, and a value, which is a variable that belongs to the set. The keys and values can be packed together into matrices K and V. 'Self'-attention refers to the simultaneous functioning on a set of queries (packed together in matrix Q). The output is computed as a weighted sum of the values, where the weight assigned to each value is computed by a compatibility function of the query with the corresponding key.

Equation (Eq.) 1 gives a mathematical representation of the attention computation:

$$\text{Attention }(Q, K, V) = \text{softmax}\left(\frac{QK^T}{\sqrt{d_k}}\right)V \qquad \text{(Eq. 1)}$$

with the softmax( ) function being used with weighting factors ($QK^T/\sqrt{d_k}$) to normalize the output to a probability distribution over predicted output classes. T here refers to the transformer (or in this case the stepwise model sequence, which QK values are being used in the optimization).

In accordance with aspects presented herein, additional layer(s) (collectively referred to as performance (P)) directed to performance, for example service level agreement—SLA, and applications integration knowledge, for instance from the dependency/affinity/code assessments, can be added to the attention mechanism to help ensure correctness of the modernization platform selected for an identified cell. The mechanism can map vectors for Q, K, V, and P to the output. As the P variable grows, it forks and then strips the variable function to the core to execute on its own, without the excess performance variable. In this manner, the vector mapping drops elements that are not necessary for the core mechanism to work, making the performance of the algorithm better because it centers on the items that for the machine learning and drops the extraneous values.

The Query aspect in accordance with a self-attention model used herein can refer to the end result of the heuristic-based algorithm accounting for the properties of specific legacy functionality—data usage, affinity, identification/removal of dead code if applicable, etc.—optimized into the refactored format (such as a container or a virtual machine, as examples). This approach can work especially well for situations of application transition and transformation as described herein because different inputs—types of code/functionality (COBOL, PL/I, etc.)— can be handled separately but run simultaneously as Q through the machine learning space, rather than, for instance, running them through separately. In this regard, a feed-forward network as presented by Eq. 2 can provide a multi-head algorithm to separate the input by type:

$$FFN(x)=\max(0,xW_1+b_1)W_2+b_s \quad \text{(Eq. 2)}$$

In Eq. 2, W is the vector that turns into a matrix to obtain the allowable items. This puts the variables in the matrix and strips out the non-necessary items that do not fit the matrix. b is applied to each position separately and identically, so it moves the algorithm from item to item as it analyzes the K, V, etc. in the various streams.

Figure 4:
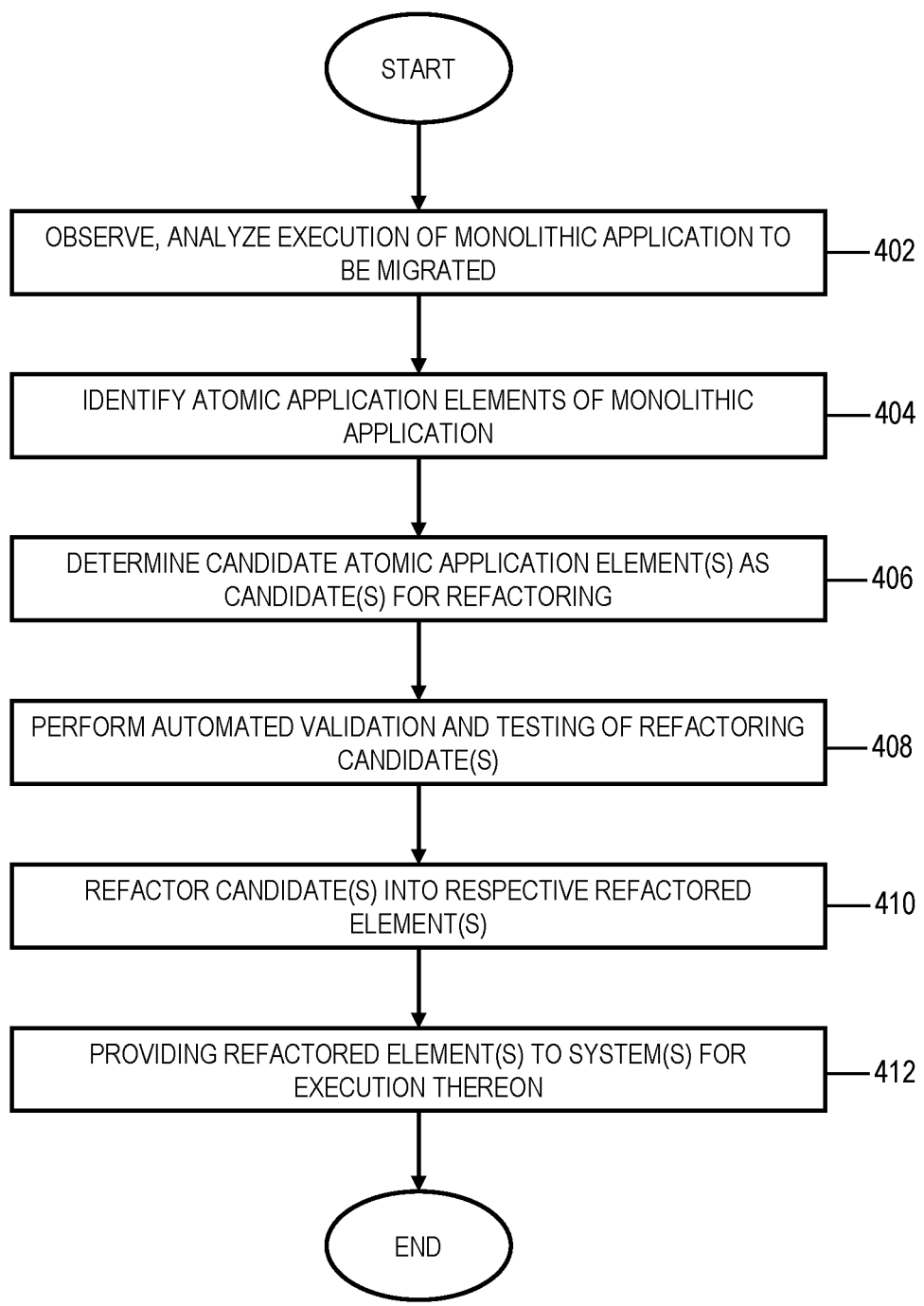
FIG. 4 depicts an example process for application transition and transformation, in accordance with aspects described herein.

FIG. 4 depicts an example process for application transition and transformation in accordance with aspects described herein. In some examples, the process is performed by one or more computer systems, such as those described herein.

The process includes observing and analyzing (402) execution of a monolithic application to be migrated. The execution of the application includes data communication of the monolithic application, and the analyzing provides properties of the data communication of the monolithic application. The properties can be anything about the communications useful for characterizing the application for purposes of migration, including dependency information. The process also includes identifying (404), by an artificial intelligence engine, for instance a machine learning-based artificial intelligence engine, and based at least in part on the provided properties of the data communication, a plurality of atomic application elements of the monolithic application. Each atomic application element of the plurality of atomic application elements can include a respective logical functional block, of the monolithic application, that functions independent (e.g. at least from a code dependency standpoint) of other atomic application elements of the monolithic application. A function or other entity that functions with such independence of the other atomic application elements, for instance, may be an atomic application element. Each atomic application element can be or include a respective unique cell, procedure, function call, routine, or subroutine of code of the monolithic application, as examples.

In embodiments, the observing and analyzing includes performing an affinity study of the monolithic application. The affinity study can include scanning the monolithic application using scripts installed on node(s) that executes the at least portion(s) of the monolithic application and identifies dependencies of the plurality of atomic application elements. The data communication can include (i) internal communication between atomic application elements of the monolithic application and/or (ii) external communication between at least one atomic application element of the monolithic application and at least one external component that is external to the monolithic application.

The process proceeds by determining (406), by the artificial intelligence engine, one or more candidate atomic application elements, of the plurality of atomic application elements, as candidates for migrating out of the monolithic application and refactoring. Each candidate atomic application element may be regarded merely as a candidate for refactoring at this point, subject to verification/testing informing whether refactoring the candidate, versus retaining it in the monolithic application, is appropriate. Determining the one or more candidate atomic application elements can include applying a machine learning model to the identified atomic application elements, and determining (i) each candidate atomic application element, of the one or more candidate atomic application elements, and (ii) one (or more) platform technologies for the candidate atomic application element. In some examples, a process trains the machine learning model using a self-attention mechanism that includes a performance vector configured to train the machine learning model to identify atomic application elements that can confidently be migrated to one or more platforms, as well as preferred or optimal platform technology for such identified atomic application elements.

The process continues with automated testing and validation (408) of at least some of the candidate atomic application elements. The automated validation and testing can include performing automated build verification testing on candidate atomic application element(s), where the build verification testing is configured to automatically identify whether performance errors exist with non-functional requirement(s) of the candidate atomic application element, and where whether the candidate atomic application element passes the automated validation and testing, and therefore is properly to be eligible for refactoring, is based at least in part on this automated build verification testing.

Based on the automated testing and validation, the process of FIG. 4 proceeds by refactoring (410) at least one candidate atomic application element of the one or more candidate atomic application elements into a respective at least one refactored element. Refactoring each candidate atomic application element of the at least one candidate atomic application element into its respective refactored element selects a platform technology for the refactored element and implements functionality of the candidate atomic application element, including the logical functional block thereof, as the refactored element of the selected platform technology. In this regard, the refactored element performs function(s) that the original atomic application performed as part of the monolithic application. The refactored element is implemented on a platform with appropriate connectivity (for instance as a VM, container, or microservice in a hybrid cloud, private cloud, etc.). In embodiments, the selected platform technology includes a portable, scalable format, for instance a container, a virtual machine, and/or a microservice, which may be implemented in various types of cloud environments (hybrid, private, etc.) as examples.

Once refactored, the refactored element(s) can be provided (412) to one or more system(s) for execution thereon. The system(s) can be the same or different across the refactored elements, and/or they may be the same or different from the system(s) that execute the monolithic application.

In examples, the process also obtains a refactoring blueprint that includes guidance for selection of a platform technology, and selects a platform technology for refactoring a candidate atomic application element of the at least one candidate atomic application element based on the guidance in the refactoring blueprint. Refactoring the candidate atomic application element into its respective refactored element of the selected platform technology can be performed based on the automated validation and testing (from 408) indicating proper functionality of the refactored element of the selected platform technology. The blueprint can inform of the "boundaries" of what is possible and/or advisable for the atomic element migrations. Different types of platform technologies might be available and potentially usable. Sometimes historical practice with other elements being migrated can help advise which technologies might be better than others in different scenarios, and therefore the blueprints can incorporate this historical information.

The refactoring of the atomic application element(s) can follow a strangler pattern for monolithic application migration, in which functionality, of the monolithic application, provided by the candidate(s) being refactored is migrated to the refactored element(s) and the monolithic application shrinks over time. Functionality, of the monolithic application, provided by other candidate atomic application element(s) of those determined at 406 can remain provided by the monolithic application for some amount of time as the refactored element(s), executing outside of the monolithic application, provide the migrated functionality. In this regard, the respective refactored element(s) and the other candidate atomic application element(s) that were not migrated can contemporaneously and cooperatively provide their respective functionalities to user(s) of the monolithic application.

It may be desired to later migrate functionality that was not initially migrated for any of various reasons. Based on updated training of the artificial intelligence engine, for instance, and following some duration of time after which some functionality was migrated and some functionality of other atomic application element(s) remained within the monolithic application, it may be determined to migrate functionality of these other atomic application element(s) out of the monolithic application and to respective refactored element(s). Additionally or alternatively, based on execution of the refactored element(s) on the system(s), a process might gather and analyze data about (i) the system(s) and (ii) an environment in which the monolithic application executes, and determining, based on that gathering and analyzing, to migrate functionality of the other candidate atomic application element(s).

It is noted that since migrating functionality of candidate atomic application elements out of the monolithic application can change the internal data communication and/or the external data communication of the atomic application elements of the monolithic application, the method can repeat, based on migrating functionality of candidate atomic application element(s) out of the monolithic application, the affinity study, i.e., repeat performing an affinity study, which is expected to identify and analyze the changed data communication (internal/external) and identify updated dependencies that might exist, for instance those of the elements that remain in the monolithic application.

The automated validation and testing can, in some examples, automatically identify and remove extraneous, non-functional code from the candidate atomic application element. Refactoring the candidate atomic application element can refactor the candidate atomic application element based on removing such extraneous, non-functional code from the element.

Although various examples are provided, variations are possible without departing from a spirit of the claimed aspects.

Figure 5:
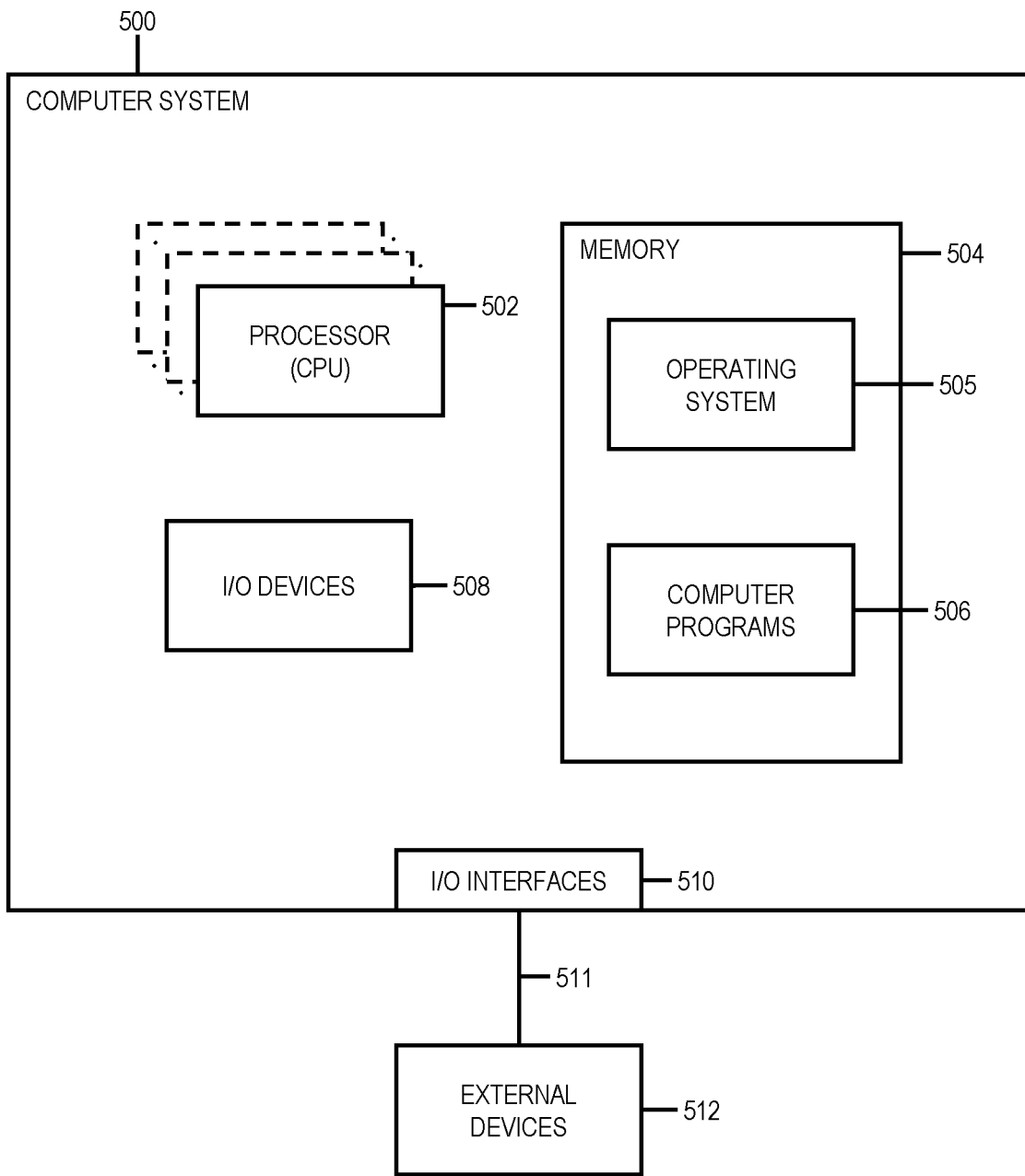
FIG. 5 depicts one example of a computer system and associated devices to incorporate and/or use aspects described herein.

Processes described herein may be performed singly or collectively by one or more computer systems, such as those described herein. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA) or Intel Corporation (Santa Clara, California, USA), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g., Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g., as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
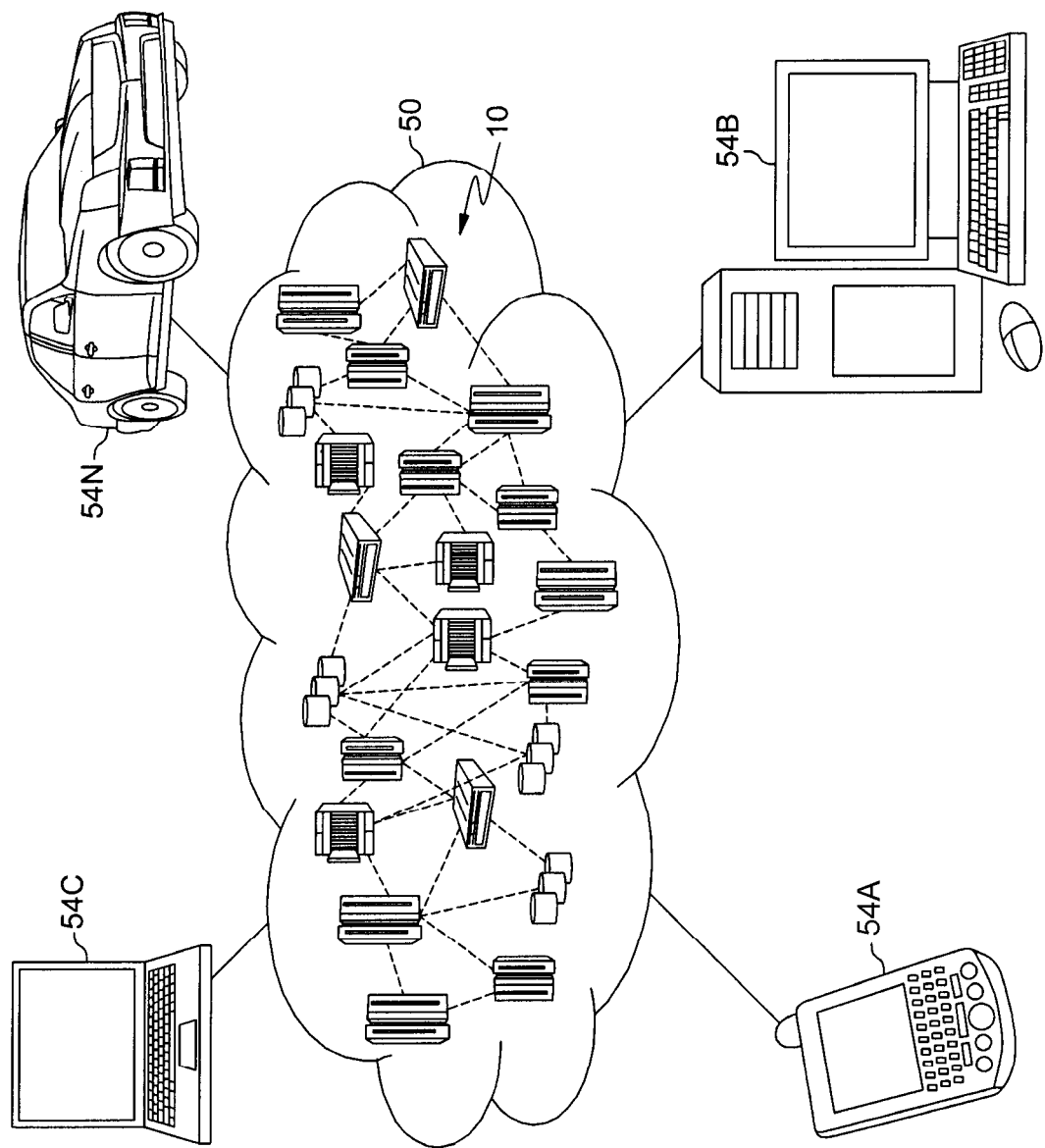
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
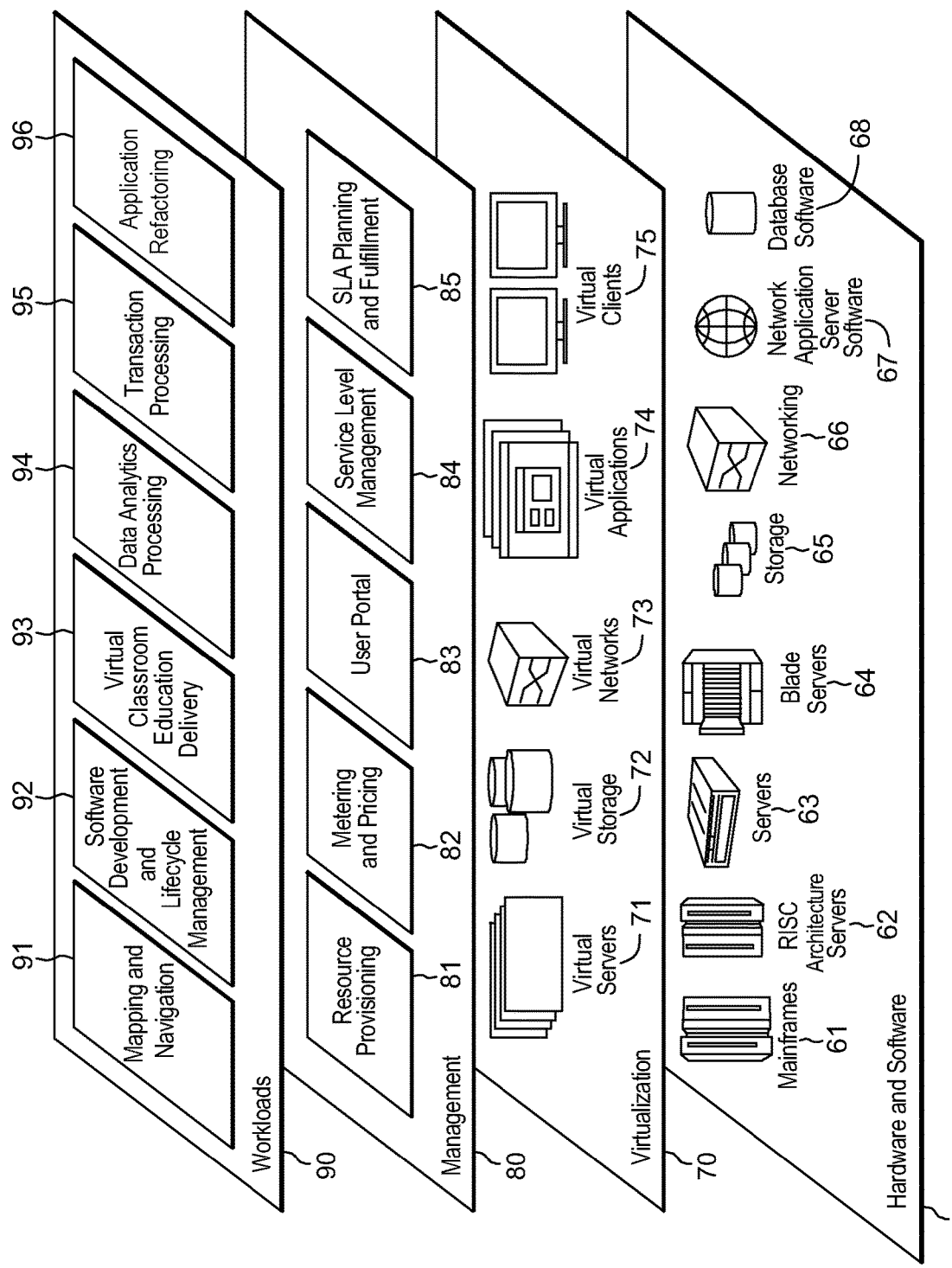
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application refactoring 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
observing and analyzing execution of a monolithic application to be migrated, the execution comprising data communication of the monolithic application, and the analyzing providing properties of the data communication of the monolithic application;
identifying, by an artificial intelligence engine, and based at least in part on the provided properties of the data communication, a plurality of atomic application elements of the monolithic application, each atomic application element of the plurality of atomic application elements comprising a respective logical functional block, of the monolithic application, that functions independent of other atomic application elements of the monolithic application;
determining, by the artificial intelligence engine, one or more candidate atomic application elements, of the plurality of atomic application elements, as candidates for migrating out of the monolithic application and refactoring;
based on automated testing and validation of at least some of the candidate atomic application elements, refactoring at least one candidate atomic application element of the one or more candidate atomic application elements into a respective at least one refactored element, wherein refactoring the at least one candidate atomic application element into its respective refactored element selects a platform technology for the at least one refactored element and implements functionality of the candidate atomic application element, including the logical functional block thereof, as the at least one refactored element of the selected platform technology; and
providing the at least one refactored element to one or more systems for execution thereon.

2. The method of claim 1, wherein the refactoring the at least one candidate atomic application element follows a strangler pattern for monolithic application migration, in which functionality, of the monolithic application, provided by the at least one candidate atomic application element is migrated to the respective at least one refactored element and the monolithic application shrinks over time.

3. The method of claim 2, wherein functionality, of the monolithic application, provided by at least one other candidate atomic application element of the one or more candidate atomic application elements, remains provided by the monolithic application for a duration of time as the respective at least one refactored element, executing outside of the monolithic application, provides a migrated functionality, wherein the respective at least one refactored element and the at least one other candidate atomic application element contemporaneously and cooperatively provide their respective functionalities to at least one user of the monolithic application.

4. The method of claim 3, further comprising, based on updated training of the artificial intelligence engine, and following the duration of time, determining to migrate functionality of the at least one other candidate atomic application element out of the monolithic application and to a respective at least one other refactored element.

5. The method of claim 1, wherein the observing and analyzing comprises performing an affinity study of the monolithic application, the affinity study comprising scanning the monolithic application using scripts installed on at least one node that executes at least a portion of the monolithic application, and identifying dependencies of the plurality of atomic application elements.

6. The method of claim 5, wherein the data communication comprises:
(i) internal communication between atomic application elements of the monolithic application; and
(ii) external communication between at least one atomic application element of the monolithic application and at least one external component that is external to the monolithic application;
wherein migrating functionality of candidate atomic application elements out of the monolithic application changes the internal communication and the external communication, and wherein the method further comprises repeating, based on the migrating functionality of candidate atomic application elements out of the monolithic application, the performing an affinity study to analyze the changes in both the changed internal and external communications and identify updated dependencies.

7. The method of claim 1, wherein the determining the one or more candidate atomic application elements comprises applying a machine learning model to the identified atomic application elements and determining (i) each candidate atomic application element, of the one or more candidate atomic application elements, and (ii) a platform technology for the candidate atomic application element, wherein the method further comprises training the machine learning model using a self-attention mechanism comprising a performance vector configured to train the machine learning model to identify atomic application elements that can confidently be migrated to one or more platforms, and platform technology for the identified atomic application elements.

8. The method of claim 1, further comprising obtaining a refactoring blueprint comprising guidance for selection of the platform technology, and selecting the platform technology for refactoring a candidate atomic application element of the at least one candidate atomic application element based on the guidance in the refactoring blueprint, wherein refactoring the candidate atomic application element into its respective refactored element of the selected platform technology is performed based on the automated validation and testing indicating proper functionality of the refactored element of the selected platform technology, and wherein the selected platform technology comprises a portable, scalable format as at least one selected from the group consisting of: a container, a virtual machine, and a microservice.

9. The method of claim 1, wherein the automated validation and testing comprises performing automated build verification testing on a candidate atomic application element, the automated build verification testing configured to automatically identify whether performance errors exist with one or more non-functional requirements of the candidate atomic application element, and wherein whether the candidate atomic application element passes the automated validation and testing, and therefore is properly to be eligible for refactoring, is based at least in part on the automated build verification testing.

10. The method of claim 1, wherein the automated validation and testing comprises automatically identifying and removing extraneous, non-functional code from the candidate atomic application element, wherein the refactoring the candidate atomic application element refactors the candidate atomic application element based on removing the extraneous, non-functional code therefrom.

11. The method of claim 1, wherein an atomic application element of the identified plurality of atomic application elements comprises one selected from the group consisting of a cell, procedure, function call, routine, and subroutine of code of the monolithic application.

12. The computer-implemented method of claim 1, wherein the method further comprises:
based on execution of the at least one refactored element on the one or more systems, gathering and analyzing data about at least one of (i) the one or more systems and (ii) an environment in which the monolithic application executes; and
determining, based on the gathering and analyzing, to migrate functionality of the at least one other candidate atomic application element.

13. A computer system comprising:
a memory; and
a processor in communication with the memory, wherein the computer system is configured to perform a method comprising:
observing and analyzing execution of a monolithic application to be migrated, the execution comprising data communication of the monolithic application, and the analyzing providing properties of the data communication of the monolithic application;
identifying, by an artificial intelligence engine, and based at least in part on the provided properties of the data communication, a plurality of atomic application elements of the monolithic application, each atomic application element of the plurality of atomic application elements comprising a respective logical functional block, of the monolithic application, that functions independent of other atomic application elements of the monolithic application;
determining, by the artificial intelligence engine, one or more candidate atomic application elements, of the plurality of atomic application elements, as candidates for migrating out of the monolithic application and refactoring;
based on automated testing and validation of at least some of the candidate atomic application elements, refactoring at least one candidate atomic application element of the one or more candidate atomic application elements into a respective at least one refactored element, wherein refactoring the at least one candidate atomic application element into its respective refactored element selects a platform technology for the at least one refactored element and implements functionality of the candidate atomic application element, including the logical functional block thereof, as the at least one refactored element of the selected platform technology; and
providing the at least one refactored element to one or more systems for execution thereon.

14. The computer system of claim 13, wherein the refactoring the at least one candidate atomic application element follows a strangler pattern for monolithic application migration, in which functionality, of the monolithic application, provided by the at least one candidate atomic application element is migrated to the respective at least one refactored element and the monolithic application shrinks over time, wherein functionality, of the monolithic application, provided by at least one other candidate atomic application element of the one or more candidate atomic application elements, remains provided by the monolithic application for a duration of time as the respective at least one refactored element, executing outside of the monolithic application, provides a migrated functionality, and wherein the respective at least one refactored element and the at least one other candidate atomic application element contemporaneously and cooperatively provide their respective functionalities to at least one user of the monolithic application.

15. The computer system of claim 13, wherein the observing and analyzing comprises performing an affinity study of the monolithic application, the affinity study comprising scanning the monolithic application using scripts installed on at least one node that executes at least a portion of the monolithic application, and identifying dependencies of the plurality of atomic application elements, wherein the data communication comprises: (i) internal communication between atomic application elements of the monolithic application, and (ii) external communication between at least one atomic application element of the monolithic application and at least one external component that is external to the monolithic application, wherein migrating functionality of candidate atomic application elements out of the monolithic application changes the internal communication and the external communication, and wherein the method further comprises repeating, based on the migrating functionality of candidate atomic application elements out of the monolithic application, the performing an affinity study to analyze the changes in both the internal and external communications and identify updated dependencies.

16. The computer system of claim 13, wherein the determining the one or more candidate atomic application elements comprises applying a machine learning model to the identified atomic application elements and determining (i) each candidate atomic application element, of the one or more candidate atomic application elements, and (ii) a platform technology for the candidate atomic application element, wherein the method further comprises training the machine learning model using a self-attention mechanism comprising a performance vector configured to train the machine learning model to identify atomic application elements that can confidently be migrated to one or more platforms, and platform technology for the identified atomic application elements.

17. The computer system of claim 13, wherein the method further comprises obtaining a refactoring blueprint comprising guidance for selection of the platform technology, and selecting the platform technology for refactoring a candidate atomic application element of the at least one candidate atomic application element based on the guidance in the refactoring blueprint, wherein refactoring the candidate atomic application element into its respective refactored element of the selected platform technology is performed based on the automated validation and testing indicating proper functionality of the refactored element of the selected platform technology, and wherein the selected platform technology comprises a portable, scalable format as at least one selected from the group consisting of: a container, a virtual machine, and a microservice.

18. A computer program product comprising:
a computer readable storage medium readable by a processing circuit and storing instructions for execution by the processing circuit for performing a method comprising:
observing and analyzing execution of a monolithic application to be migrated, the execution comprising data communication of the monolithic application, and the analyzing providing properties of the data communication of the monolithic application;
identifying, by an artificial intelligence engine, and based at least in part on the provided properties of the data communication, a plurality of atomic application elements of the monolithic application, each atomic application element of the plurality of atomic application elements comprising a respective logical functional block, of the monolithic application, that functions independent of other atomic application elements of the monolithic application;

determining, by the artificial intelligence engine, one or more candidate atomic application elements, of the plurality of atomic application elements, as candidates for migrating out of the monolithic application and refactoring;

based on automated testing and validation of at least some of the candidate atomic application elements, refactoring at least one candidate atomic application element of the one or more candidate atomic application elements into a respective at least one refactored element, wherein refactoring the at least one candidate atomic application element into its respective refactored element selects a platform technology for the at least one refactored element and implements functionality of the candidate atomic application element, including the logical functional block thereof, as the at least one refactored element of the selected platform technology; and providing the at least one refactored element to one or more systems for execution thereon.

19. The computer program product of claim 18, wherein the refactoring the at least one candidate atomic application element follows a strangler pattern for monolithic application migration, in which functionality, of the monolithic application, provided by the at least one candidate atomic application element is migrated to the respective at least one refactored element and the monolithic application shrinks over time, wherein functionality, of the monolithic application, provided by at least one other candidate atomic application element of the one or more candidate atomic application elements, remains provided by the monolithic application for a duration of time as the respective at least one refactored element, executing outside of the monolithic application, provides a migrated functionality, and wherein the respective at least one refactored element and the at least one other candidate atomic application element contemporaneously and cooperatively provide their respective functionalities to at least one user of the monolithic application.

20. The computer program product of claim 18, wherein the determining the one or more candidate atomic application elements comprises applying a machine learning model to the identified atomic application elements and determining (i) each candidate atomic application element, of the one or more candidate atomic application elements, and (ii) a platform technology for the candidate atomic application element, wherein the method further comprises training the machine learning model using a self-attention mechanism comprising a performance vector configured to train the machine learning model to identify atomic application elements that can confidently be migrated to one or more platforms, and platform technology for the identified atomic application elements.

* * * * *